(12) United States Patent
Wu et al.

(10) Patent No.: US 12,658,453 B2
(45) Date of Patent: Jun. 16, 2026

(54) COMPOSITE CURRENT COLLECTOR, ELECTRODE SHEET, BATTERY, AND ELECTRICAL DEVICE

(71) Applicant: CONTEMPORARY AMPEREX TECHNOLOGY CO., LIMITED, Ningde (CN)

(72) Inventors: Kai Wu, Ningde (CN); Xianghui Liu, Ningde (CN); Xin Liu, Ningde (CN); Qisen Huang, Ningde (CN); Mingling Li, Ningde (CN); Qiguo Cai, Ningde (CN); Cheng Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/294,576

(22) Filed: Aug. 8, 2025

(65) Prior Publication Data

US 2025/0364570 A1 Nov. 27, 2025

Related U.S. Application Data

(63) Continuation of application No. PCT/CN2023/130809, filed on Nov. 9, 2023.

(30) Foreign Application Priority Data

Aug. 11, 2023 (CN) .......................... 202311010514.0

(51) Int. Cl.
*H01M 4/00* (2006.01)
*H01M 4/66* (2006.01)

(52) U.S. Cl.
CPC ........... *H01M 4/667* (2013.01); *H01M 4/661* (2013.01); *H01M 4/662* (2013.01); *H01M 4/663* (2013.01); *H01M 4/668* (2013.01)

(58) Field of Classification Search
CPC ............ H01M 50/533; H01M 50/531; H01M 50/536; H01M 4/667; H01M 4/02; Y02E 60/10
See application file for complete search history.

(56) References Cited

FOREIGN PATENT DOCUMENTS

| CN | 109216050 A | 1/2019 |
| CN | 110943222 A | 3/2020 |

(Continued)

OTHER PUBLICATIONS

Wu et al., Pole Piece, Electrode Assembly, Battery Monomer, Battery And Electric Device, May 2023, See the Abstract. (Year: 2023).*

(Continued)

*Primary Examiner* — Tiffany Legette
*Assistant Examiner* — Monique M Wills
(74) *Attorney, Agent, or Firm* — XSENSUS LLP

(57) ABSTRACT

A composite current collector includes an insulating substrate and a conductive layer. the conductive layer is the one provided at both sides of the insulating substrate in a thickness direction of the insulating substrate; in a direction perpendicular to a thickness of the composite current collector, the composite current collector includes an active material support region and a tab connection region, a thickness of an insulating substrate of the tab connection region is less than that of an insulating substrate of the active material support region; and a thickness of a conductive layer of the tab connection region is greater than that of a conductive layer of the active material support region.

17 Claims, 5 Drawing Sheets

(56) References Cited

FOREIGN PATENT DOCUMENTS

| CN | 110943223 | A |   | 3/2020  |        |            |
|----|-----------|---|---|---------|--------|------------|
| CN | 111180666 | A |   | 5/2020  |        |            |
| CN | 112186128 | A |   | 1/2021  |        |            |
| CN | 112397722 | A |   | 2/2021  |        |            |
| CN | 216818393 | U |   | 6/2022  |        |            |
| CN | 115528250 | A |   | 12/2022 |        |            |
| CN | 115986132 | A | * | 4/2023  | ...... | H01M 50/533 |
| CN | 218867347 | U |   | 4/2023  |        |            |
| CN | 116154416 | A | * | 5/2023  | ...... | H01M 50/533 |
| CN | 219203435 | U | * | 6/2023  |        |            |
| CN | 116722148 | A |   | 9/2023  |        |            |
| JP | 2004-022466 | A |   | 1/2004  |        |            |
| WO | 2022/198470 | A1 |  | 9/2022  |        |            |
| WO | 2023/093298 | A1 |  | 6/2023  |        |            |

OTHER PUBLICATIONS

Huang et al., Pole Piece And Battery, Jun. 2023, See the Abstract. (Year: 2023).*

Wang et al., Current Collector And Preparation Method & Application Thereof, Apr. 2023. See the Abstract. (Year: 2023).*

International Search Report and Written Opinion mailed on Apr. 16, 2024, received for PCT Application PCT/CN2023/130809, filed on Nov. 9, 2023, 12 pages including English Translation.

Notification to Grant mailed on Oct. 12, 2023, received for CN Application 202311010514.0, 5 pages including English Translation.

First Office Action on mailed on Sep. 15, 2023, received for CN Application 202311010514.0, 20 pages including English Translation.

* cited by examiner

1000

100

22

221

TD-direction Stretching ------------------------------▶ MD-direction Stretching

Edge Roller-Pressing Thinning Device

Active Material Layer

Active Material Layer

COMPOSITE CURRENT COLLECTOR, ELECTRODE SHEET, BATTERY, AND ELECTRICAL DEVICE

CROSS-REFERENCE TO RELATED APPLICATIONS

The present application is a bypass continuation of International Application No. PCT/CN2023/130809, filed on Thursday, Nov. 9, 2023, which claims priority to Chinese Patent Application No. 202311010514.0, filed on Friday, Aug. 11, 2023 and entitled "Composite Current Collector, Electrode Sheet, Battery, and Electrical Device", each are incorporated herein by reference in their entireties.

TECHNICAL FIELD

The present application relates to a composite current collector, an electrode sheet, a battery and an electrical device.

BACKGROUND

A lithium-ion battery is widely used in electric vehicles and consumer electronics due to advantages such as high energy density, high input power, long cycle life, and less pollution.

In a conventional lithium-ion battery, copper or aluminum foil, as a conventional current collector, is widely used for current conduction for a lithium-ion battery and has a bearing or supporting effect; and recently, the lithium-ion battery is increasingly required in term of high energy density and thermal runaway probability, so application of composite current collectors is focused in many studies.

SUMMARY

The present application aims to provide a composite current collector, an electrode sheet, a battery and an electrical device.

The embodiments of the present application are implemented as follows.

In a first aspect, an embodiment of the present application provides a composite current collector, including an insulating substrate and a conductive layer, wherein the conductive layer is disposed on both sides of the insulating substrate in a thickness direction of the insulating substrate.

In a direction perpendicular to a thickness of the composite current collector, the composite current collector includes an active material support region and a tab connection region, a thickness of the insulating substrate of the tab connection region is less than that of the insulating substrate of the active material support region; and a thickness of a conductive layer of the tab connection region is greater than that of a conductive layer of the active material support region.

In the above technical solution, the thickness of the insulating substrate of the tab connection region is less than that of the insulating substrate of the active material support region; and the thickness of the conductive layer of the tab connection region is greater than that of the conductive layer of the active material support region, which is more beneficial to increase a metallization degree of an edge of the composite current collector, and thereby to increase a current flow effect of the electrode sheet of the tab connection region when the tab is connected to the tab connection region.

In some optional embodiments, the composite current collector has a same thickness at each position, a thickness of the insulating substrate of the active material support region is D1; and a thickness of the insulating substrate of the tab connection region is D3, where D3<D1.

In the above technical solution, the thickness of the insulating substrate of the active material support region satisfy the above relation with the thickness of the insulating substrate of the tab connection region, which is more beneficial to increase a metallization degree of the tab connection region of the composite current collector, and thereby to increase a current flow effect of the electrode sheet of the tab connection region when the tab is connected to the tab connection region.

In some optional embodiments, a thickness of the conductive layer of the tab connection region is D4; a thickness of the insulating substrate of the tab connection region is D3; and the ratio of D4 to D3 is A, where A≥1; and optionally, 1≤A≤2.

A composite current collector has an intermediate layer which is a non-conductive polymer, and metal is required for switchover welding for tab welding, increasing a welding failure rate and also easily generating a failure of a battery at a large rate. The above technical solution, by setting the thickness of the conductive layer of the tab connection region and the thickness of the insulating substrate of the tab connection region to satisfy the above relation, greatly increases the metallization degree of the tab connection region of the composite current collector, and may satisfy the requirement for ultrasonic direct welding, so that it can be achieved that the composite current collector does not need switchover welding, greatly expanding the application of the composite current collector. The above technical solution does not require switchover welding, and can satisfy a high-rate charging and discharging the requirement for a battery, facilitating to satisfy a more strict requirement for thermal runaway for a battery.

In some optional embodiments, a thickness of the insulating substrate of the active material support region is D1; a thickness of the insulating substrate of the tab connection region is D3; and the ratio of D1 to D3 is B, where B≥2.

In the above technical solution, by controlling the lower limit of the ratio of the thickness of the insulating substrate of the active material support region to the thickness of the insulating substrate of the tab connection region to be within the above range, an overall strength and ductility of the insulating substrate can be effectively controlled to satisfy requirements for both manufacturing and overall mechanical performance of the composite current collector, while maintaining the sufficient strength and ductility of the active material support region.

In some optional embodiments, a thickness of the insulating substrate of the active material support region is D1, where 3 μm≤D1≤10 μm.

In the above technical solution, the thickness of the insulating substrate of the active material support region is set within the above range, so that the composite current collector has good mechanical performance.

In some optional embodiments, a thickness of the conductive layer of the active material support region is D2, where 0.5 μm≤D2≤1.5 μm.

In the above technical solution, the thickness of the conductive layer of the active material support region is set within the above range, so that the composite current collector has a good current conducting effect.

In some optional embodiments, a thickness of the insulating substrate of the tab connection region is D3, where D3≤3 μm, and optionally, 1.5 μm≤D3≤3 μm.

In the above technical solution, the thickness of the insulating substrate of the tab connection region is set within the above range, and facilitates to achieve an excellent metallization degree of the tab connection region, so that the tab connection region can satisfy requirements for ultrasonic direct welding, and the composite current collector can be directly welded without using switchover welding.

In some optional embodiments, a thickness of the conductive layer of the tab connection region is D4, D4≥1.5 μm, optionally, 1.5 μm≤D4≤4 μm.

In the above technical solution, the thickness of the conductive layer of the tab connection region is set within the above range, facilitating to increase strength performance of an edge of the composite current collector and reduce the probability that the composite current collector is cracked by roller-pressing in a subsequent process of battery manufacturing.

In some optional embodiments, a width of the tab connection region is L1, where L1≥10 mm, optionally 10 mm≤L1≤40 mm.

In the above technical solution, by controlling the width of the tab connection region within the above range, not only a requirement for a shortest tab for electrode sheet welding can be satisfied, but also a length of a tab can be controlled, and a space design of a folded tab for a battery and a requirement for a tab length for winding can also be satisfied.

In some optional embodiments, the insulating substrate is added with a conductive material; and optionally, the conductive material includes at least one of conductive carbon black, carbon nanotubes, acetylene black, or carbon fibers.

In some optional embodiments, based on mass percent, an addition ratio of the conductive material is 3%-10% of the mass of the insulating substrate.

In the above technical solution, by controlling the addition ratio of the conductive material in the insulating substrate to be within the above range, not only a requirement of increasing welding conductivity can be satisfied to have a welding aid effect, but also the mechanical performance of the insulating substrate is not affected due to an excessive content.

In some optional embodiments, a material of the insulating substrate includes at least one of an organic polymer insulating material, an inorganic insulating material, or a composite material;

optionally, the organic polymer insulating material includes at least one of polyamide, polyterephthalate, polyimide, polyethylene, polypropylene, polystyrene, polyvinyl chloride, an acrylonitrile-butadiene-styrene copolymer, polybutylene terephthalate, poly-p-phenylene terephthalamide, polypropylene, polyoxymethylene, epoxy resin, phenolic resin, polytetrafluoroethylene, polyvinylidene fluoride, silicone rubber or polycarbonate;

optionally, the inorganic insulating material includes at least one of alumina, silicon carbide or silicon dioxide; and optionally, the composite material includes at least one of an epoxy resin glass fiber reinforced composite material or a polyester resin glass fiber reinforced composite material.

In some optional embodiments, a material of the conductive layer includes at least one of a metal conductive material or a carbon-based conductive material;

optionally, the metal conductive material includes at least one of aluminum, copper, nickel, titanium, silver, a nickel-copper alloy, or an aluminum-zirconium alloy; and optionally, the carbon-based conductive material includes at least one of graphite, acetylene black, graphene, or carbon nanotubes.

According to a second aspect, an embodiment of the present application provides an electrode sheet including the composite current collector provided in the first aspect.

In the above technical solution, the electrode sheet, by being provided with the composite current collector provided in the first aspect, can increase a preparation yield of an electrode sheet; and the electrode sheet is applied to a battery, facilitating to increase the cycle performance and energy density of the battery.

According to a third aspect, an embodiment of the present application provides a battery including the electrode sheet provided in the second aspect.

In the above technical solution, the battery, by being provided with the electrode sheet provided in the second aspect, facilitates to obtain a high energy density while satisfying a high-rate fast charging requirement, and to obtain a relatively low thermal runaway probability.

According to a fourth aspect, an embodiment of the present application provides an electric device, including the battery provided in the third aspect.

DESCRIPTION OF DRAWINGS

To describe the technical solutions in the embodiments of the present application more clearly, the following briefly describes the accompanying drawings required for describing the embodiments. It should be understood that the following accompanying drawings show only some embodiments of the present application, and therefore should not be considered as a limitation on the scope. A person of ordinary skill in the art may further obtain other related accompanying drawings according to these accompanying drawings without creative efforts.

FIG. 9 is a schematic structural diagram of an edge thinning device for producing an insulating substrate of a

Figure 10:
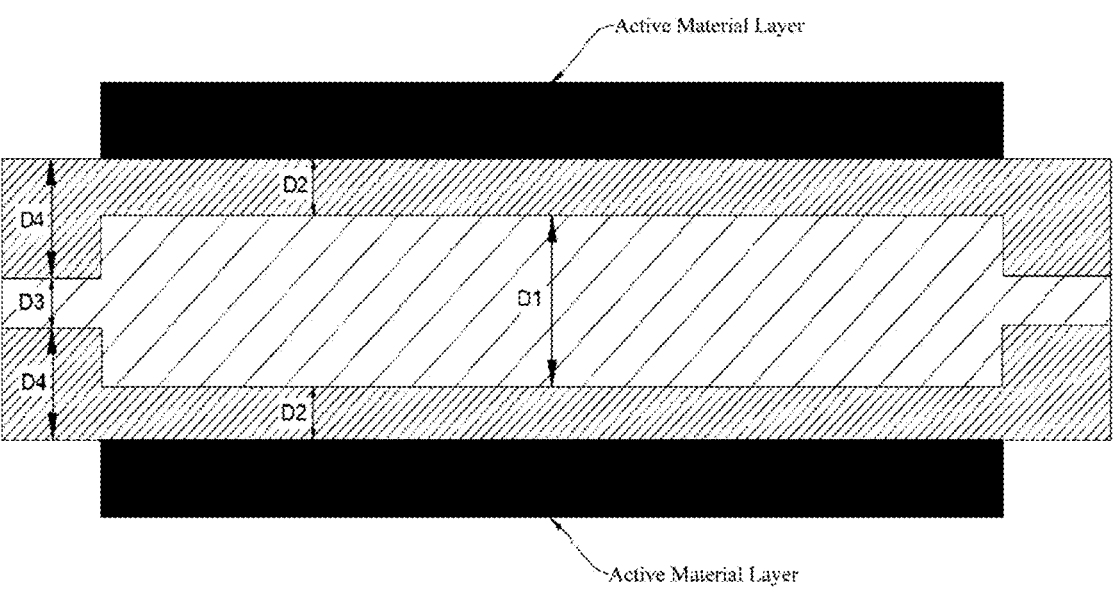

5 composite current collector according to some embodiments of the present application; and FIG. 10 is a schematic structural diagram of a composite current collector coated with a positive electrode active material layer according to another some other embodiments of the present application.

REFERENCE NUMBER vehicle 1000;
battery 100; controller 200; motor 300;
box 10; first part 11; second part 12; accommodation space 13;
battery cell 20; housing 21; electrode assembly 22; electrode terminal 23; pressure relief structure 24;
shell 211; cover 212; positive electrode sheet 221; negative electrode sheet 222; separator 223;
positive electrode current collector 2211; positive electrode active material layer 2212;
negative electrode current collector 2221; negative electrode active material layer 2222.

DESCRIPTION OF EMBODIMENTS

Embodiments of the technical solutions of the present application are described in detail below with reference to the drawings. The following embodiments are only used to more clearly illustrate the technical solutions of the present application, and thus are used as examples only, and are not intended to limit the protection range of the present application.

Unless defined otherwise, all technical and scientific terms used herein have the same meaning as commonly understood by a person skilled in the art to which the present application belongs; the terms used herein are used for describing particular embodiments only and are not intended to limit the present application; and the terms "comprising", "including", and "having" and any variations thereof in the description, claims and the above drawings of the present application are intended to cover non-exclusive inclusion.

In the description of the embodiments of the present application, the technical terms "first", "second", and the like are used only for distinguishing between different objects, but cannot be construed to indicate or imply relative importance or implicitly indicate the number, specific order, or primary/secondary relationship of indicated technical features.

In the description of the embodiment of the present application, the orientation or positional relationship indicated by the technical terms "inner", "outer", etc. is based on the orientation or positional relationship shown in the drawings, only to facilitate the description of the embodiment of the present application and simplify the description, rather than to indicate or imply that the referred device or element must have a specific orientation, be constructed and operated in a specific orientation, and therefore cannot be understood as a limitation to the embodiment of the present application.

In the descriptions of the embodiment of the present application, unless otherwise explicitly specified and defined, the technical terms "mounted", "connected", "connect", "fixed", etc. are to be understood in a broad sense, for example, may be fixedly connected, detachably connected, or integrally connected, may be directly connected, or may be indirectly connected via an intermediate medium. A person of ordinary skill in the art may understand the specific meanings of the above terms in the embodiments of the present application according to specific situations.

Reference to "an embodiment" herein means that a particular feature, structure, or characteristic described with reference to the embodiment can be included in at least one embodiment of the present application. The phrase in various places in the description does not necessarily all refer to the same embodiment, or a separate or alternative embodiment mutually exclusive of other embodiments. It is explicitly and implicitly understood by a person skilled in the art that the embodiments described herein may be combined with other embodiments.

In the embodiments of the present application, the same reference numerals denote the same component, and a detailed description of the same component is omitted in different embodiments for sake of brevity. It should be understood that the size of various components, such as the height, length, and width, and the size of the integrated device, such as the overall height, length, and width, in the embodiments of the present application shown in the figures are merely illustrative and should not be construed as limiting the present application.

A composite current collector generally includes a middle layer of a non-conductive polymer and a surface layer of a metal conductor, the non-conductive polymer having a structural support effect; and the metal conductor is used to provide electrons for an electrode active material and connect with a tab, that is, having effects of current conduction and collection, and current flow of an electrode sheet in a tab region.

However, the application of the composite current collector is limited since it includes an intermediate layer which is a non-conductive polymer. It is found by research that the non-conductivity of the polymer enables a low metallization degree of a tab connection region at an edge of a composite current collector, so that the composite current collector has a low current flow effect.

An embodiment of the present application provides a composite current collector, including an insulating substrate and a conductive layer, wherein the conductive layer is disposed on both sides of the insulating substrate in a thickness direction of the insulating substrate; and In a direction perpendicular to a thickness of the composite current collector, the composite current collector includes an active material support region and a tab connection region, a thickness of the insulating substrate of the tab connection region is less than that of the insulating substrate of the active material support region; and a thickness of a conductive layer of the tab connection region is greater than that of a conductive layer of the active material support region.

In the above technical solution, the thickness of the insulating substrate of the tab connection region is less than that of the insulating substrate of the active material support region; and the thickness of the conductive layer of the tab connection region is greater than that of the conductive layer of the active material support region, which is more beneficial to increase a metallization degree of an edge of the composite current collector, and thereby to increase a current flow effect of the electrode sheet of the tab connection region when the tab is connected to the tab connection region.

The electrode sheet provided by the present application includes the composite current collector as described above.

The electrode sheet, by being provided with the composite current collector provided in the first aspect, can increase a preparation yield of an electrode sheet; and the electrode sheet is applied to a battery, facilitating to increase the cycle performance and energy density of the battery.

The battery provided by the present application includes the above electrode sheet, and the battery, by being provided with the electrode sheet provided in the second aspect, facilitates to obtain a high energy density while satisfying a high-rate fast charging requirement, and to obtain a relatively low thermal runaway probability.

An embodiment of the present application provides an electric device including the above battery.

Figure 1:
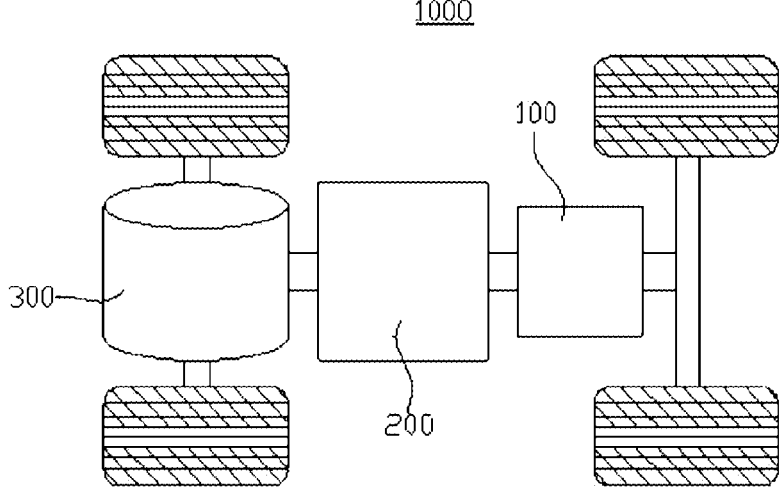
FIG. 1 is a schematic structural diagram of a vehicle according to some embodiments of the present application.

Referring to FIG. 1, FIG. 1 is a schematic diagram of a structure of a vehicle 1000 according to some embodiments of the present application. The vehicle 1000 may be a fuel vehicle, a gas vehicle, or a new energy vehicle, and the new energy vehicle may be a battery electric vehicle, a hybrid vehicle, or a range-extended electric vehicle. Inside the vehicle 1000, a battery 100 is provided, which may be provided at the bottom, head, or tail of the vehicle 1000. The battery 100 may be used to power the vehicle 1000, for example, the battery 100 may be used as an operating power source of the vehicle 1000. The vehicle 1000 may further include a controller 200 and a motor 300, and the controller 200 is used to control the battery 100 to power the motor 300, for example, for a working power requirement for the vehicle 1000 during starting, navigating, and driving the vehicle 1000.

In some embodiments of the present application, the battery 100 may be used not only as an operating power source for the vehicle 1000, but also as a driving power source for the vehicle 1000, instead of or partially instead of fuel or natural gas to provide driving power for the vehicle 1000.

In the present application, the battery 100 is a single physical module that includes one or more battery cells 20 for providing a voltage and capacity. The battery 100 generally includes a box 10 for encapsulating one or more battery cells 20. The box 10 can prevent liquids or other foreign objects from affecting the charging or discharging of the battery cells 20.

Figure 2:
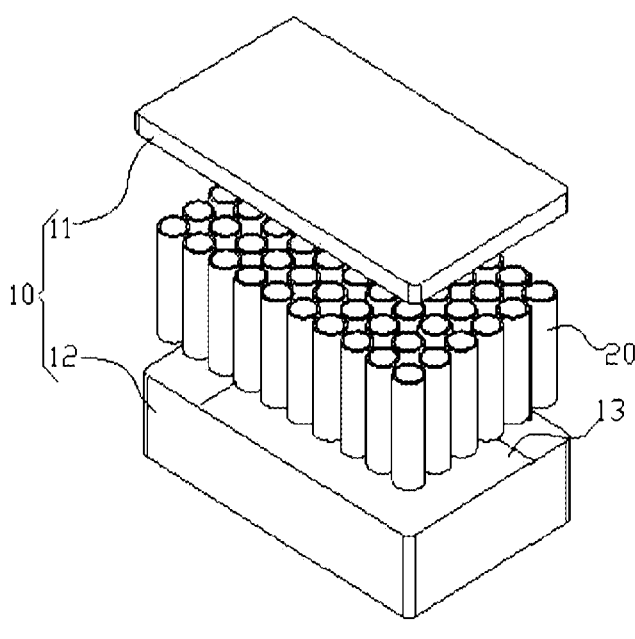
FIG. 2 is an exploded view of a battery according to some embodiments of the present application.

Referring to FIG. 2, it is an exploded diagram of the battery 100 provided in some embodiments of the present application, the battery 1100 may include a box 10 and a battery cell 20, and the battery cell 20 is accommodated in the box 10. Here, the box 10 is used to accommodate the battery cell 20, and the box 10 may have various structures. In some embodiments, the box body 10 may include a first part 11 and a second part 12, and the first part 11 and the second part 12 fit to each other to define an accommodation space 13 for accommodating the battery cell 20. The second part 12 may be a hollow structure with an opening at one end, the first part 11 is a sheet-shaped structure, and the first part 11 covers an opening side of the second part 12, to form the box 10 having the accommodation space 13; and the first part 11 and the second part 12 each may be a hollow structure with an opening at one end, and an opening side of the first part 11 covers an opening side of the second part 12 to form the box 10 having the accommodation space 13. Of course, the first part 11 and the second part 12 may be in various shapes such as cylinder, cuboid, and the like.

In the battery 100, one or more battery cells 20 may be provided. If a plurality of battery cells 20 are provided, the plurality of battery cells 20 may be subjected to series connection, parallel connection, or series-parallel connection, and the series-parallel connection means that the plurality of battery cells 20 are subjected to both series connection, and parallel connection. A plurality of battery cells 20 may be directly connected in series, in parallel, or in a combination of both, and the whole of the plurality of battery cells 20 is accommodated in the box 10. Or, the plurality of battery cells 20 may be subjected to series connection, or parallel connection, or series-parallel connection to form a module, and a plurality of modules are integrated by series connection, parallel connection, or series-parallel connection, and accommodated within the box 10. The battery 100 may further include another structure. For example, a plurality of battery cells 20 may be electrically connected by a current convergence component, to implement parallel connection, series connection, or series-parallel connection of the plurality of battery cells 20.

Here, each battery cell 20 may be a li-ion battery, such as a secondary battery or a primary battery, or may be a lithium-sulfur battery, a sodium-ion battery, or a magnesium-ion battery, but is not limited thereto.

Figure 3:
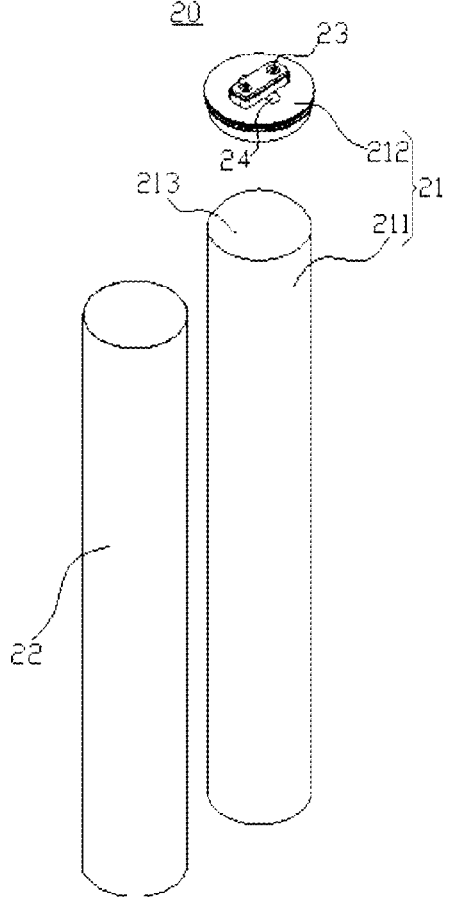
FIG. 3 is an exploded view of the battery cell shown in FIG. 2.

Referring to FIG. 3, it is an exploded view of the battery cell 20 shown in FIG. 2. The battery cell 20 refers to a minimum unit constituting the battery 100. The battery cell 20 may include a housing 21, an electrode assembly 22 and an electrolyte, the electrode assembly 22 and an electrolyte being accommodated in the housing 21.

The housing 21 may include a shell 211 and a cover 212. The shell 211 is an assembly configured to cooperate with the cover 212 to form an internal sealing space of the battery cell 20, where the formed sealing space can be used to accommodate the electrode assembly 22, an electrolyte, and other components. The cover 212 refers to a component that covers an opening of the shell 211 to isolate an internal environment of the battery cell 20 from an external environment thereof, the shape of the cover 212 may adapt to the shape of the shell 211 to cooperate with the shell 211, and the cover 212 may also be provided with functional components such as an electrode terminal 23, a pressure relief structure 24 or the like. A sealing ring may be configured between the opening of the shell 211 and the cover 212, to implement sealing between the shell 211 and the cover 212.

The shell 211 and the cover 212 may be in various shapes and various dimensions, such as cuboid, cylinder, hexagonal prism, and the like. Specifically, the shapes of the shell 211 and the cover 212 may be determined based on a specific shape and dimension of the electrode assembly 22. The shell 212 and the cover 212 may be made of various materials, for example, but not limited to, metal such as copper, iron, aluminum, stainless steel, an aluminum alloy, etc. The sealing ring may be made of various materials, for example, but not limited to, materials that are resistant to corrosion by electrolyte, and have high toughness and fatigue resistance, such as PP (polypropylene), PC (polycarbonate), PET (polyethylene terephthalate), etc. A plating layer may be formed on an outer surface of the shell 211, and the plating layer may be made of various materials, for example, but not limited to, corrosion-resistant materials such as Ni, Cr, etc.

Figure 4:
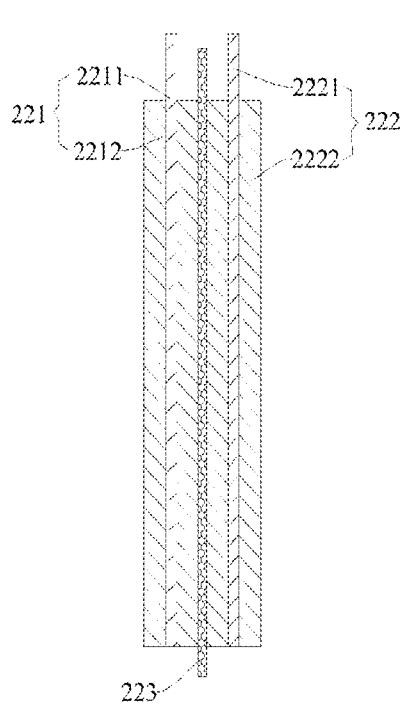
FIG. 4 is a schematic local structural diagram of an electrode assembly according to some embodiments of the present application.

Referring to FIG. 4, the electrode assembly 22 may consist of a positive electrode sheet 221, a negative electrode sheet 222, and a separator 223. The separator 223 is disposed between the positive electrode sheet 221 and negative electrode sheet 222 to have a separating effect. The electrode assembly 22 may be a wound structure or a laminated structure, and the embodiments of the present application are not limited thereto.

Figure 5:
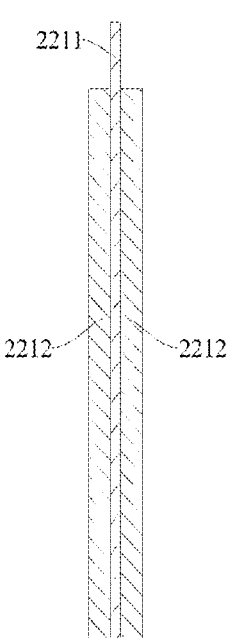
FIG. 5 is a schematic local structural diagram of an electrode sheet according to some embodiments of the present application.

Referring to FIG. 5, the negative electrode sheet 222 includes a negative electrode current collector 2221 and a negative electrode active material layer 2222 including a negative electrode active material. The negative electrode active material includes at least one of graphite, silicon, a silicon alloy, or a tin alloy.

With continued reference to FIG. 5, the positive electrode sheet 221 includes a positive electrode current collector

2211 and a positive electrode active material layer 2212 including a positive electrode active material.

In some implementations of the present application, both the negative electrode current collector 2221 and the positive electrode current collector 2211 may be composite current collectors.

In some implementations of the present application, the composite current collector includes an insulating substrate and a conductive layer. The conductive layer is the one provided at both sides of the insulating substrate in a thickness direction of the insulating substrate; in a direction perpendicular to a thickness of the composite current collector, the composite current collector includes an active material support region and a tab connection region, a thickness of an insulating substrate of the tab connection region is less than that of an insulating substrate of the active material support region; and a thickness of a conductive layer of the tab connection region is greater than that of a conductive layer of the active material support region.

In the above technical solution, the thickness of the insulating substrate of the tab connection region is less than that of the insulating substrate of the active material support region; and the thickness of the conductive layer of the tab connection region is greater than that of the conductive layer of the active material support region, which is more beneficial to increase a metallization degree of an edge of the composite current collector, and thereby to increase a current flow effect of the electrode sheet of the tab connection region when the tab is connected to the tab connection region.

Further, in some implementations of the present application, the tab connection region above is a region of the composite current collector that is used to connect a tab, for example, a region that is occupied by a tab in a composite current collector when the tab is welded to the composite current collector. Further optionally, the tab connection region above may be disposed at one side edge of the composite current collector, or at two side edges of the composite current collector.

Further, referring to FIG. 10, in some implementations of the present application, the active material support region above is a region coated with an active material layer; for example, it may be a region coated with a positive electrode active material layer or a region coated with a negative electrode active material layer. Further optionally, the active material support region above is disposed in a middle region of the composite current collector.

Further, in some implementations of the present application, the above "a thickness of an insulating substrate of a tab connection region" above, when a cross-sectional shape is regular (a thickness at each position in the region is the same), "a thickness of an insulating substrate of tab connection region" is a thickness of the region; and when the cross-sectional shape is irregular (thicknesses at each position in the region are not completely the same, or changes in gradient), "a thickness of an insulating substrate of tab connection region" is an average thickness of the entire region. The "thickness" for other regions also follows the above rule. For example, "a thickness of a conductive layer of a tab connection region", when a cross-sectional shape is irregular, "a thickness of a conductive layer of a tab connection region" above refers to the average thickness of the region.

Figures 6, 7, 8:
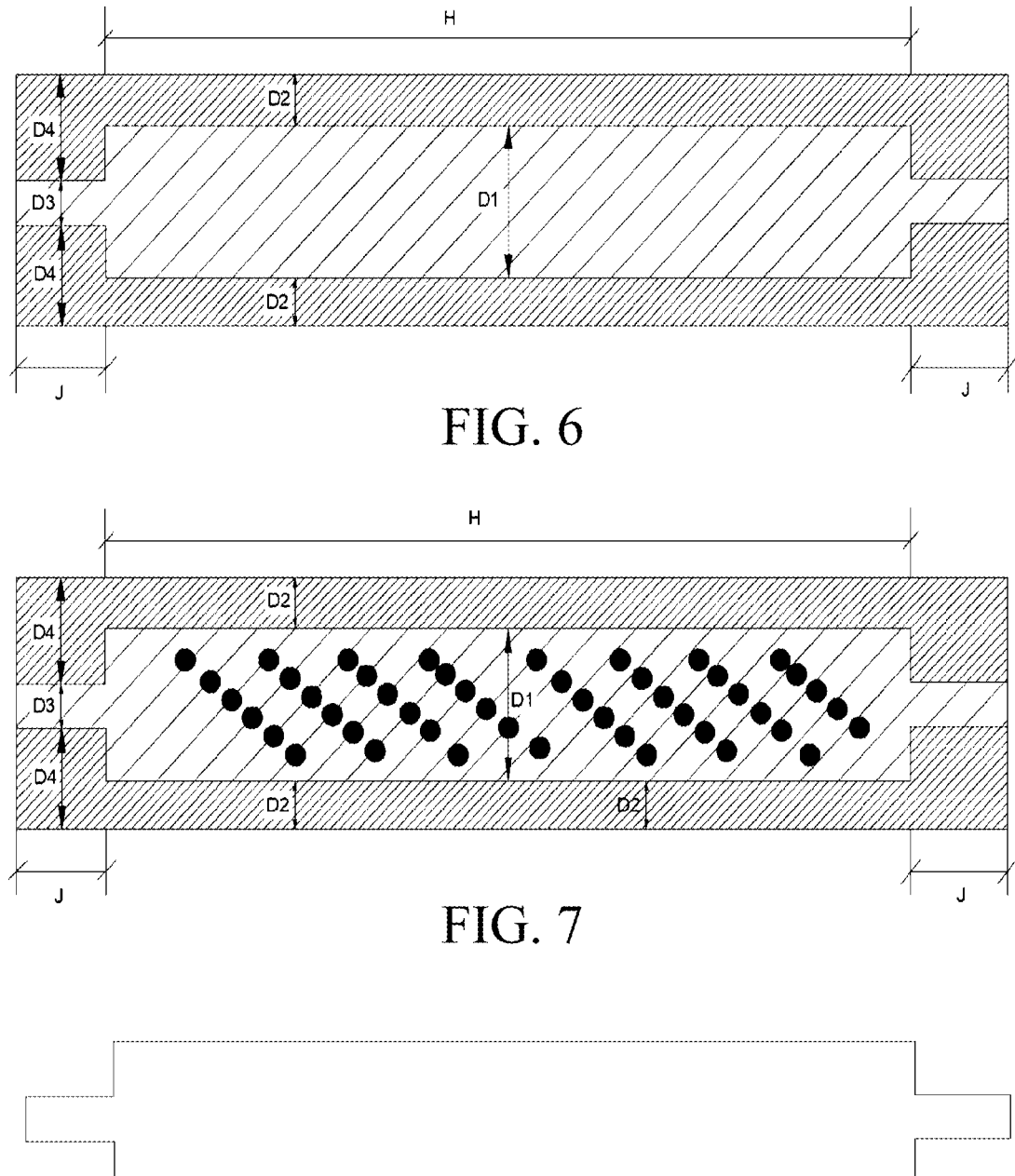
FIG. 6 is a schematic structural diagram of a composite current collector according to some embodiments of the present application.
FIG. 7 is another schematic structural diagram of a composite current collector according to some embodiments of the present application.
FIG. 8 is a schematic structural diagram of a die head for preparing an insulating substrate according to some embodiments of the present application.

Further, referring to FIG. 6, in some implementations of the present application, thicknesses at each position of the composite current collector are the same, a thickness of the insulating substrate of the active material support region (the region H in FIG. 6) is D1, a thickness of the insulating substrate of the tab connection region (the region J in FIG. 6) is D3, where D3<D1.

In the above technical solution, the thickness of the insulating substrate of the active material support region satisfy the above relation with the thickness of the insulating substrate of the tab connection region, which is more beneficial to increase a metallization degree of the tab connection region of the composite current collector, and thereby to increase a current flow effect of the electrode sheet of the tab connection region when the tab is connected to the tab connection region.

Further, a conventional composite current collector usually has a design of an integrated polymer support layer, and an conductive layer and a polymer support layer have a uniform-thickness design regardless of an active material bearing region or a tab region, usually showing that the thickness of the support layer is greater than that of the conductive layer. Since a base film of a support layer of an edge tab region is an insulator, upper and lower conductive layers can not be welded by a conventional ultrasonic direct welding mode, and usually, it is required that 2 pieces of switchover metal foil materials are welded to the upper and lower conductive layers, respectively, and finally, an electrode sheet and a tab are subjected to multi-layer tab ultrasonic welding. Here, the switchover welding also brings great challenges to the reliability of the composite current collector welding. If ultrasonic energy is too low, metal layers cannot be effectively fused to have insufficient welding; and if ultrasonic energy is too large, metal layers are easily cracked by direct vibrating, also affecting a current conducting ability. This switchover welding not only increases a welding failure rate, but also easily generate a failure of a battery at a large rate.

In some implementations of the present application, referring to FIG. 6, a thickness of the conductive layer of the tab connection region is D4; a thickness of the insulating substrate of the tab connection region is D3; and the ratio of D4 to D3 is A, where A≥1.

The above technical solution, by setting the thickness of the conductive layer of the tab connection region and the thickness of the insulating substrate of the tab connection region to satisfy the above relation, greatly increases the metallization degree of the tab connection region of the composite current collector. For a composite current collector with a conventional thickness (3.5 μm~11.5 μm), the requirement for ultrasonic direct welding may be satisfied, so that it can be achieved that the composite current collector does not require switchover welding, greatly expanding the application of the composite current collector. The above technical solution does not require switchover welding, greatly reducing a welding failure rate; and effectively reduces the probability that a battery fails at a large rate, also facilitating to satisfy a more strict requirement for thermal runaway for a battery.

In other optional implementations of the present application, only one side tab may be provided, and in this case, only one side tab connection region is provided in the composite current collector.

Further optically, in some implementations of the present application, 1≤A≤2.

For example, in some implementations of the present application, A is 1, A is 1.1, A is 1.2, A is 1.3, A is 1.4, A is 1.5, A is 1.6, A is 1.7, A is 1.8, A is 1.9, A is 2.0, or A is a value within a range formed by any two of the above values.

Further, in some implementations of the present application, referring to FIG. 6, a thickness of the insulating substrate of the active material support region is D1, a thickness of the insulating substrate of the tab connection region is D3, and a ratio of D1 to D3 is B, where B≥2.

In the above technical solution, by controlling the lower limit of the ratio of the thickness of the insulating substrate of the active material support region to the thickness of the insulating substrate of the tab connection region to be within the above range, an overall strength and ductility of the insulating substrate can be effectively controlled to satisfy requirements for both manufacturing and overall mechanical performance of the composite current collector, while maintaining the sufficient strength and ductility of the active material support region.

Further, in some implementations of the present application, referring to FIG. 6, a thickness of the insulating substrate of the active material support region is D1, where 3 μm≤D1≤10 μm.

In the above technical solution, the thickness of the insulating substrate of the active material support region is set within the above range, so that the composite current collector has good mechanical performance.

For example, in some implementations of the present application, D1 is 3 μm, 4 μm, 5 μm, 6 μm, 7 μm, 8 μm, 9 μm, or 10 μm, or D1 is a value within a range formed by any two of the above values.

Further, in some implementations of the present application, referring to FIG. 6, a thickness of the conductive layer of the active material support region is D2, where 0.5 μm≤D2≤1.5 μm.

In the above technical solution, the thickness of the conductive layer of the active material support region is set within the above range, so that the composite current collector has a good current conducting effect.

For example, in some implementations of the present application, D2 is 0.5 μm, 600 nm, 800 nm, 1 μm, 1.1 μm, 1.2 μm, 1.3 μm, 1.4 μm, or 1.5 μm, or D2 is a value within a range formed by any two of the above values.

Further, in some implementations of the present application, referring to FIG. 6, a thickness of the insulating substrate of the tab connection region is D3, where D3≤3 μm.

In the above technical solution, the thickness of the insulating substrate of the tab connection region is set within the above range, and facilitates to achieve an excellent metallization degree of the tab connection region, so that the tab connection region can satisfy requirements for ultrasonic direct welding, and the composite current collector can be directly welded without using switchover welding.

Further optionally, in some implementations of the present application, 1.5 μm≤D3≤3 μm.

For example, in some implementations of the present application, D3 is 1.5 μm, 1.6 μm, 1.8 μm, 2.0 μm, 2.2 μm, 2.3 μm, 2.5 μm, 2.6 μm, 2.8 μm, or 3.0 μm; or D3 is a value within a range formed by any two of the above values.

Further, after a coating process for the composite current collector, a welding region is always exposed and directly contacts with a transmission roller system of an apparatus, wear and scratches are easily generated in a boundary region between a welding region and a coating area due to a speed difference between the apparatus and the current collector, and a sub-micron-level conductive layer is also easily damaged or even cracked, causing an electrode sheet having an increased sheet resistance or even losing a conductive ability; the above electrode sheet subjected to insufficient welding or damaged needs to be removed in a battery manufacturing process, causing a decrease in a process yield and an increase in a manufacturing cost; and the electrode sheet subjected to insufficient welding or damaged is, if it is not identified in a battery producing process, used in a battery, the electrode sheet is also easily further corroded by an electrolyte solution to cause a failure, causing accelerated cycle performance degradation and a reliability problem. After traditional switchover welding, a height of a folded tab from an electrolyte sheet of a composite current collector is imperceptibly increased by about 7 mm, greatly reducing a space utilization rate of a battery.

Further, in some implementations of the present application, referring to FIG. 6, a thickness of the conductive layer of the tab connection region is D4, where D4≥1.5 μm.

In the above technical solution, the thickness of the conductive layer of the tab connection region is set within the above range, facilitating to increase strength performance of an edge of the composite current collector and reduce the probability that the composite current collector is cracked by roller-pressing in a subsequent process of battery manufacturing. Also, the height of the electrode sheet of the composite current collector can also be reduced to increase a space utilization rate of a battery.

Further optionally, in some implementations of the present application, 1.5 μm≤D4≤4 μm.

For example, in some implementations of the present application, D4 is 1.5 μm, 1.8 μm, 2.0 μm, 2.5 μm, 2.8 μm, 3.0 μm, 3.2 μm, 3.5 μm, 3.8 μm, or 4.0 μm; or D4 is a value within a range formed by any two of the above values.

Further, in some implementations of the present application, the thicknesses of the above conductive layer disposed at both sides of the insulating substrate may be optionally set to be the same, or be different.

Exemplarily, in some implementations of the present application, the thicknesses D4 of the conductive layers disposed at the tab connection region of the insulating substrate may be the same, for example, 1.5 μm; or may be different, with 1.5 μm for one side and 2.0 μm for the other side.

Exemplarily, in some implementations of the present application, the thicknesses D2 of the conductive layers disposed at the active material support regions on both sides of the insulating substrate may be the same, for example, both 0.5 μm, or may be different, with 0.5 μm for one side and 600 nm for the other side.

Further, in some implementations of the present application, a width of the tab connection region is L1, where L1≥10 mm.

In the above technical solution, by controlling the width of the tab connection region within the above range, not only a requirement for a shortest tab for electrode sheet welding can be satisfied, but also a length of a tab can be controlled, and a space design of a folded tab for a battery and a requirement for a tab length for winding can also be satisfied.

Further optionally, in some implementations of the present application, 10 mm≤L1≤40 mm.

For example, in some implementations of the present application, L1 is 10 mm, 12 mm, 15 mm, 20 mm, 25 mm, 30 mm, 35 mm, 38 mm, or 40 mm, or L1 is a value within a range formed by any two of the above values.

In some implementations of the present application, a method for testing a length of a tab region is to perform a width test by using a graduation ruler.

Further, in some implementations of the present application, referring to FIG. 7, the insulating substrate is added with a conductive material (black dots in FIG. 7).

Further, in some implementations of the present application, the conductive material includes at least one of conductive carbon black, carbon nanotubes, acetylene black, or carbon fibers.

Exemplarily, in some implementations of the present application, the conductive material is selected from any one of conductive carbon black, carbon nanotubes, acetylene black, or carbon fibers; or in some implementations of the present application, the conductive material is selected from a mixture of conductive carbon black and carbon nanotubes, and the two may be mixed in any mass ratio; or in some implementations of the present application, the conductive material is selected from a mixture of acetylene black, acetylene black and carbon fibers, and the three may be mixed in any mass ratio; or in some implementations of the present application, the conductive material is selected from a mixture of conductive carbon black, carbon nanotubes, acetylene black, and carbon fibers, and the four may be mixed in any mass ratio.

Further, in some implementations of the present application, in percentage by mass, an addition ratio of the conductive material is 3%-10% of mass of the insulating substrate.

In the above technical solution, by controlling the addition ratio of the conductive material in the insulating substrate to be within the above range, not only a requirement of increasing welding conductivity can be satisfied to have a welding aid effect, but also the mechanical performance of the insulating substrate is not affected due to an excessive content.

Further optionally, in some implementations of the present application, based on mass percent, an addition proportion of the conductive material is 3.1%-9.9% of mass of the insulating substrate.

Exemplarily, in some implementations of the present application, implementations, the addition ratio of the conductive material is 3.2%, 3.5%, 4%, 4.5%, 5%, 5.5%, 6%, 6.5%, 7%, 8%, 9%, 9.5% of the mass of the insulating substrate, or the addition ratio of the conductive material is a value within a range formed by any two of the above values.

In some implementations of the present application, a test method for the components of the conductive material of the insulating substrate is to obtain a trace element content percentage by elemental ICP analysis.

Further, in some implementations of the present application, a material of the insulating substrate includes at least one of an organic polymer insulating material, an inorganic insulating material, or a composite material.

Exemplarily, in some implementations of the present application, the material of the insulating substrate is selected from any one of an organic polymer insulating material, an inorganic insulating material, or a composite material; or in some implementations of the present application, the material of the insulating substrate is selected from a mixture of an organic polymer insulating material and an inorganic insulating material, and the two may be mixed in any ratio; or in some implementations of the present application, the material of the insulating substrate is selected from a mixture of an organic polymer insulating material, an inorganic insulating material, and a composite material, and the three may be mixed in any ratio.

Further, in some implementations of the present application, the organic polymer insulating material includes at least one of polyamide, polyterephthalate, polyimide, polyethylene, polypropylene, polystyrene, polyvinyl chloride, an acrylonitrile-butadiene-styrene copolymer, polybutylene terephthalate, poly-p-phenylene terephthalamide, polypropylene, polyoxymethylene, epoxy resin, phenolic resin, polytetrafluoroethylene, polyvinylidene fluoride, silicone rubber or polycarbonate.

Exemplarily, in some implementations of the present application, the organic polymer insulating material is selected from polyethylene, polypropylene or polystyrene; or in some implementations of the present application, the organic polymer insulating material is selected from a mixture of polyoxymethylene and epoxy resin, and the two may be mixed in any ratio; or in some implementations of the present application, the organic polymer insulating material is selected from a mixture of polytetrafluoroethylene, polyvinylidene fluoride and silicone rubber, and the three may be mixed in any ratio.

Further, in some implementations of the present application, the inorganic insulating material includes at least one of aluminum oxide, silicon carbide, or silicon dioxide.

Exemplarily, in some implementations of the present application, the inorganic insulating material is selected from any one of aluminum oxide, silicon carbide or silicon dioxide; or in some implementations of the present application, the inorganic insulating material is selected from a mixture of aluminum oxide and silicon carbide, and the two may be mixed in any ratio; or in some implementations of the present application, the inorganic insulating material is selected from a mixture of aluminum oxide, silicon carbide and silicon dioxide, and the three may be mixed in any ratio.

Further, in some implementations of the present application, the composite material includes at least one of an epoxy resin glass fiber reinforced composite material or a polyester resin glass fiber reinforced composite material.

Exemplarily, in some implementations of the present application, the composite material is selected from any one of an epoxy resin glass fiber reinforced composite material or a polyester resin glass fiber reinforced composite material; or in some implementations of the present application, the composite material is selected from a mixture of an epoxy resin glass fiber reinforced composite material and a polyester resin glass fiber reinforced composite material, and the two may be mixed in any ratio.

Further, in some implementations of the present application, a material of the conductive layer includes at least one of a metal conductive material or a carbon-based conductive material.

For example, in some implementations of the present application, the material of the conductive layer is selected from any one of a metal conductive material or a carbon-based conductive material; or the material of the conductive layer is selected from a mixture of a metal conductive material and a carbon-based conductive material, and the metal conductive material and the carbon-based conductive material may be mixed in any proportion.

Further, in some implementations of the present application, the metal conductive material includes at least one of aluminum, copper, nickel, titanium, silver, a nickel-copper alloy, or an aluminum-zirconium alloy.

For example, in some implementations of the present application, the metal conductive material is selected from aluminum, copper, or nickel; or in some implementations of the present application, the metal conductive material is selected from a mixture of aluminum and copper, and the two may be mixed in any proportion.

Further, in some implementations of the present application, the carbon-based conductive material includes at least one of graphite, acetylene black, graphene, or carbon nanotubes.

Exemplarily, in some implementations of the present application, the carbon-based conductive material is selected from any one of graphite, acetylene black, graphene or carbon nanotubes, or in some implementations of the present application, the carbon-based conductive material is selected from a mixture of graphite and acetylene black, and the two may be mixed in any ratio; or in some implementations of the present application, the carbon-based conductive material is selected from a mixture of graphite, acetylene black and graphene, and the three may be mixed in any ratio.

Further, in some implementations of the present application, the above insulating substrate may be formed by co-extruding a drawn film in an extrusion manner by using a die head with a special structure. Exemplarily, in some implementations of the present application, FIG. 8 shows a die head in a dropper shape, and by employing the die head, the above insulating substrate can be formed by co-extruding a drawn film in an extrusion manner.

Figure 9:
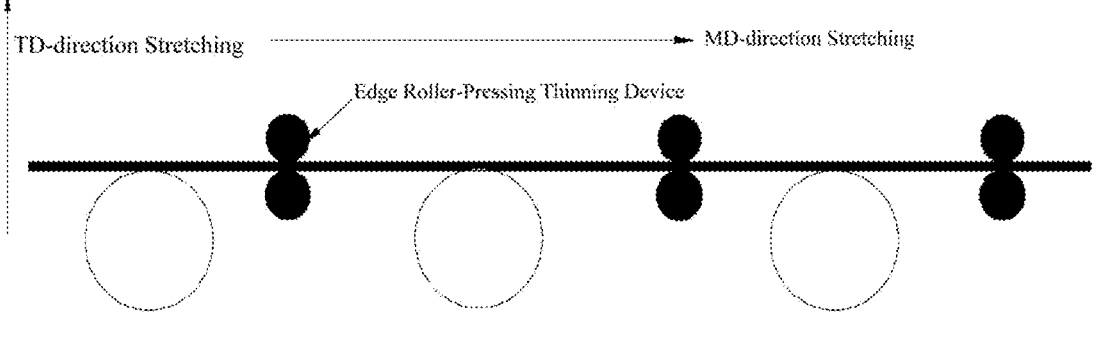

Further, referring to FIG. 9, in some implementations of the present application, a multi-stage roller-pressing thinning device is added in a front stage of film-drawing, film-drawing is performed by pressing a freshly extruded cast sheet by a roller into a thin sheet, so that the insulating substrate forms a special structure in which a tab connection region is relatively thin and an active material support region is relatively thick.

Further, in some implementations of the present application, when the insulating substrate is added with the conductive material, it needs to be added for co-extrusion and film-drawing in a corresponding mass percent ratio when the master batch of the insulating substrate material is melted, to form the insulating substrate added with the conductive material and having the above special structure.

Further, in some implementations of the present application, the conductive layer may be formed at both sides of the insulating substrate by at least one of electroplating, vapor deposition, or electroless plating.

Further optionally, in some implementations of the present application, the above vapor deposition method may be selected as a physical vapor deposition method; the physical vapor deposition method may be selected as at least one of an evaporation method or a sputtering method; the evaporation method may be selected as at least one of a vacuum evaporation method, a thermal evaporation method, or an electron beam evaporation method; and the sputtering method may be selected as a magnetron sputtering method.

Further, in some implementations of the present application, thickening of a conductive layer of an edge tab connection region can be performed by increasing a current in an edge region and a plating solution concentration distribution by conducting modes for both water-electroplating ends, and a middle active material support region is thinned by adopting an anode shield; and optionally, the solution is a copper sulfate solution, and the anode is an insoluble anode plate for metal deposition.

Further optionally, in some implementations of the present application, the thickening of the conductive layer of the edge tab connection region is achieved by employing evaporation; and many times of evaporation may be employed, wire-feeding evaporation is performed separately on an edge tab after evaporation is completed for a conductive layer of a middle region, and edge thickening is performed on other regions without using wire feeding and an evaporation mode.

Some specific examples are listed below to better describe the present application.

[Preparation of Insulating Substrate]

Extrusion was performed employing a die head shown in FIG. 8. After master batches or cut sheets of an insulating substrate material were melted, they were extruded through the die head shown in FIG. 8 to form a thick cast sheet, and the cast sheet was subjected to a film drawing treatment by setting lateral and longitudinal stretching ratios in different directions, where longitudinal-direction (MD direction) stretching was followed by lateral direction (TD direction) stretching. Here, a thinning treatment for an edge tab region employed the edge thinning device for producing an insulating substrate shown in FIG. 9, and a roller device was added after first stretching to further press a thinned casting sheet by a roller into a thin film which was then subjected to multi-stage stretching to finally form a thin film. Here, a conductive material was added in a state where its cut sheets or master batches were melted, and then co-extrusion and film stretching were performed.

[Preparation of Composite Current Collector]

The insulating substrate prepared above was subjected to surface cleaning, and then placed in a vacuum plating chamber, a high-purity metal wire in the metal evaporation chamber was melted and evaporated at a high temperature of 1600° C. to 2000° C., and the evaporated metal was passed through a cooling system in the vacuum plating chamber and finally deposited on the surfaces of both sides of the insulating substrate to form a conductive layer. A mechanism for melting a metal wire consists of several melting units (including an evaporation boat, a wire feeding mechanism, and a heating current loop) arranged in the width direction of the insulating substrate and independently controlled. A mode to thicken the conductive layer of the edge tab connection region is to turn on only an edge wire feeding mechanism with a middle wire feeding mechanism turned off, and to complete thickening by multiple times of evaporation.

[Performance Test of Composite Current Collector]

(1). A method to test a thickness of an insulating substrate/a thickness of a conductive layer is: a cross-sectional sample of a composite current collector is prepared by a liquid nitrogen quenching method or an argon ion etching method, a secondary electron imaging morphology of the cross-section of the sample is observed by a scanning electron microscope at magnification (at the magnification of 1000-5000), and thicknesses of a conductive layer and a support layer are measured, where a minimum resolution can be nanoscale.

(2) A method to test a strength and ductility of a composite current collector is: a sample is cut into a strip with a top width of 15 mm in the MD direction, and a strength of a tab connection region and a ductility of the tab connection region are tested. Results are shown in table 2. In table 2, an average strength value is employed to characterize a strength of a tab connection region; and an average ductility value is employed to characterize ductility of the tab connection region.

An average intensity value =

$$\text{the sum of intensity values of 10 samples}/10;$$

An average ductility value =

$$\text{the sum of ductility values of 10 samples}/10.$$

EXAMPLES AND COMPARATIVE EXAMPLES

A composite current collector is provided, and performance parameters of composite current collectors of respective examples or comparative examples are shown in table 1.

In table 1, D1 is a thickness of an insulating substrate of an active material support region;

D2 is a thickness of a conductive layer of an active material support region;

D3 is a thickness of an insulating substrate of a tab connection region;

D4 is a thickness of a conductive layer of a tab connection region;

a ratio of D4 to D3 is A; and a ratio of D1 to D3 is B.

[Preparation and Detection of Lithium-Ion Battery]

A positive electrode slurry or a negative electrode slurry was coated on a surface of a current collector by a conventional battery coating process to obtain a positive electrode sheet or a negative electrode sheet after dying at 100° C. At both sides of an electrode sheet, tab connection regions with different widths were left for welding metallic tabs; and surface active materials for positive and negative electrode sheets were compacted by a conventional battery cold pressing process, wherein a compaction density for a positive electrode sheet was set to 3.4 $g/cm^3$, and a compaction density for a negative electrode sheet was set to 1.6 $g/cm^3$.

Numbers of broken strips and tab cracks were collected during cold pressing, and data was counted every 1000 m.

Then, by a conventional battery manufacturing process, the positive electrode sheet, the separator, and the negative electrode sheet were wound together into a bare cell, positive and negative electrode tabs were each subjected to multi-layer welding by ultrasonic welding, and a switchover welding process was canceled. Here, the welding power was 4 KW-6 KW, and the amplitude was 25 um-60 um. In example 7 and comparative example 1, a switchover welding mode was employed, two narrow current collectors were attached from top to bottom along a root of a tab of a welding region, and the welding region and a width-fixed substrate were welded by roll welding to form an integral tab.

To evaluate a reliability of welding for a multi-layer tab, an ultrasonic-welding tensile strength of a tab is evaluated.

(1). An ultrasonic-welding tensile strength of a multi-layer tab is measured using a Gotech tensile tester.

A welding tensile strength of a multi-layer tab after welding is measured using a Gotech tensile tester. A tab after ultrasonic welding is cut along its root, a sample is stretched at a speed of 5 mm/min, and a maximum force value when welding is broken is read and taken as a welding tensile strength (N).

(2). 32 samples are selected for testing, wherein samples are randomly selected form welded batteries. A mechanical bonding effect of welding is evaluated by an average value of an ultrasonic-welding tensile strength of a sample to judge whether there is insufficient welding. Here, a calculation formula for an average value and a standard deviation of a tensile strength is as follows:

an average welding tensile strength value = the sum of welding tensile strength values of 32 samples/32;

Influence of composite current collectors in respective examples and comparative examples on a welding result is shown in table 2, and the welding tensile strength in table 2 is an average value of a welding tensile strength. Cold pressing crack times (times/1000 m) in table 2

To evaluate a welding reliability of welding for a single-layer tab employing switchover welding in comparative examples, a tensile strength of a tab with single-layer switchover welding is evaluated.

(1). A welding tensile strength of a single-layer switchover tab is measured using a Gotech tensile tester.

A welding tensile strength of a single-layer tab after welding is measured using a Gotech tensile tester. A tab is cut into a fixed sample with a width of 50 mm along a film sheet area with a length appropriate for convenient testing, the sample is stretched at a speed of 5 mm/min, and the maximum force value when welding is broken is read as a welding tensile strength (N).

(2). 32 samples are selected for testing, wherein samples are randomly selected form welded batteries. A mechanical bonding effect of welding is evaluated by an average value of a welding tensile strength of a sample to judge whether there is insufficient welding. Here, a calculation formula for an average value and a standard deviation of a tensile strength is as follows:

an average welding tensile strength value = the sum of the welding pulling values of 32 samples/32.

Then, a cell after welding was placed in a battery shell, and an electrolyte solution (EC:EMC in a volume ratio of 3:7, $LiPF_6$ was 1 mol/L) was injected, followed by sealing, formation, and other processes, to finally obtain a lithium-ion battery.

By collecting DCR data of 10 batteries in a short period, the influence of different conductive layer thicknesses of a tab connection region on DCR of the battery is observed.

(1). DCR testing is performed using a cell testing apparatus, and a specific testing method is as follows: a cell capacity is adjusted to 50% SOC, a voltage V1 is recorded, and a voltage value V2 is obtained with a discharge current of 4C for 30 s, where DCR=(V1−V2)/4C (the discharge current)

$DCR$ Value = the sum of $DCR$ values of 10 samples/10;

(2). Temperature Rise Testing: before a cell is placed in a housing, a temperature sensing wire is glued by a Teflon tape at a position of an ultrasonic welding seam, then encapsulating and liquid injection are performed, and under discharging with different current rates (3C, 4C, 5C), a temperature-rise difference at an ultrasonic welding position is tested by a multiplex thermodetector to evaluate a fast charging effect.

A temperature rise value at an ultrasonic welding position = the sum of temperature rise values at ultrasonic welding positions of 10 samples/10.

A performance test result of a lithium battery is shown in table 2.

19

TABLE 1

| | D1 (μm) | D2 (μm) | D3 (μm) | D4 (μm) | A | B | Conductive Material Addition Amount (wt. %) |
|---|---|---|---|---|---|---|---|
| Example 1 | 6 | 1 | 1 | 3 | 3 | 6 | 4 |
| Example 2 | 6 | 1 | 1.5 | 3 | 2 | 4 | 4 |
| Example 3 | 6 | 1 | 2 | 3 | 1.5 | 3 | 4 |
| Example 4 | 6 | 1 | 2.5 | 3 | 1.2 | 2.4 | 4 |
| Example 5 | 6 | 1 | 3 | 3 | 1 | 2 | 4 |
| Example 6 | 6 | 1 | 3.5 | 3 | 0.9 | 1.7 | 4 |
| Comparative Example 1 | 6 | 1 | 6 | 1 | 0.17 | 1 | 4 |
| Example 7 | 6 | 1 | 2 | 1 | 0.5 | 3 | 4 |
| Example 8 | 6 | 1 | 2 | 2.5 | 1.25 | 3 | 4 |
| Example 9 | 6 | 1 | 2 | 3 | 1.5 | 3 | 4 |
| Example 10 | 6 | 1 | 2 | 4 | 2 | 3 | 4 |
| Example 11 | 6 | 1 | 2 | 4.5 | 2.25 | 3 | 4 |
| Example 12 | 6 | 1 | 2 | 3 | 1.5 | 3 | 2.5 |
| Example 13 | 6 | 1 | 2 | 3 | 1.5 | 3 | 3 |
| Example 14 | 6 | 1 | 2 | 3 | 1.5 | 3 | 7 |
| Example 15 | 6 | 1 | 2 | 3 | 1.5 | 3 | 10 |
| Example 16 | 6 | 1 | 2 | 3 | 1.5 | 3 | 12 |
| Example 17 | 6 | 1 | 2 | 3 | 1.5 | 3 | 0 |

TABLE 2

| | Tab Connection Region Strength (Mpa) | Tab Connection Region Elongation (%) | Times of Cold Press Cracking (times/1000 m) | Ultrasonic Tab Welding Pulling Force (N) | DCR | Temperature Rise with 3 C Discharging at Ultrasonic Welding Seam (°C.) | Temperature Rise with 4 C Discharging at Ultrasonic Welding Seam (°C.) | Temperature Rise with 5 C Discharging at Ultrasonic Welding Seam (°C.) |
|---|---|---|---|---|---|---|---|---|
| Example 1 | 312 | 3% | 3 | 65 | 0.42 | 58 | 85 | 92 |
| Example 2 | 290 | 15% | 0.06 | 61 | 0.43 | 60 | 88 | 95 |
| Example 3 | 285 | 20% | 0.03 | 55 | 0.42 | 65 | 93 | 100 |
| Example 4 | 250 | 22% | 0.02 | 50 | 0.41 | 67 | 99 | 103 |
| Example 5 | 245 | 33% | 0.03 | 47 | 0.41 | 72 | 110 | 125 |
| Example 6 | 188 | 10% | 1.1 | 30 | 0.6 | 75 | 113 | 130 |
| Example 7 | 270 | 5% | 2 | 5 | \ | \ | \ | \ |
| Example 8 | 280 | 21% | 0.05 | 51 | 0.55 | 70 | 103 | 123 |
| Example 9 | 285 | 20% | 0.03 | 55 | 0.45 | 67 | 98 | 104 |
| Example 10 | 275 | 15% | 0.02 | 62 | 0.47 | 65 | 94 | 97 |
| Example 11 | 288 | 4% | 1.2 | 66 | 0.4 | 62 | 92 | 96 |
| Comparative Example 1 | 205 | 50% | 0.3 | 4 | \ | \ | \ | \ |
| Example 12 | 284 | 21% | 0.03 | 54 | 0.45 | 66 | 97 | 104 |
| Example 13 | 286 | 22% | 0.03 | 54 | 0.43 | 62 | 92 | 97 |
| Example 14 | 283 | 21% | 0.03 | 56 | 0.42 | 60 | 91 | 96 |
| Example 15 | 286 | 18% | 0.04 | 54 | 0.41 | 58 | 89 | 94 |
| Example 16 | 282 | 4% | 2 | 35 | 0.8 | 83 | 128 | 155 |
| Example 17 | 285 | 20% | 0.03 | 55 | 0.45 | 67 | 98 | 104 |

It can be seen from table 2 above that:

the temperature rise under discharging at different rates at ultrasonic welding seams in each above example of the present application is better than in Comparative Example 1 which is a composite current collector with a conventional integrated structure. It can be seen that the composite current collector provided by the examples of the present application improves the current flow function of the electrode sheet of the tab connection region.

Further, compared with Comparative Example 1, the welding tensile strengths for Examples 1-6 are significantly increased. This is because the conventional composite current collector in Comparative Example 1 has a tab connection region with a low metallization degree, and ultrasonic welding performed directly easily causes an insufficient welding problem, causing a greatly reduced welding tensile strength or a welding failure. Comparative Example 1 can not employ direct welding, but switchover welding.

Further, by comparing Examples 2-6 with each other, it can be seen that when the thickness D3 of the insulating substrate of the tab connection region is less than 1.5 μm, the elongation of the tab connection region of the composite current collector is relatively low, which may cause problems of cold pressing cracks and a welding failure; and when the thickness D3 of the insulating substrate of the tab connection region is greater than 3 μm, the intensity of the tab connection region is reduced, the elongation of the tab connection region is reduced, and a cold pressing crack is increased. Therefore, when 1.5 μm≤D3≤3 μm, the tab connection region has an excellent strength and elongation with a high welding reliability.

Further, compared with Comparative Example 1, the welding tensile strengths of Examples 8-11 are significantly increased. This is because the conventional composite current collector in Comparative Example 1 has a tab connection region with a low metallization degree, and ultrasonic welding performed directly easily causes an insufficient welding problem, causing a greatly reduced welding tensile strength or a welding failure.

Further, by comparing Examples 8-11 with each other, it can be seen: when the ratio A of the thickness D4 of the conductive layer of the tab connection region to the thickness D3 of the insulating substrate of the tab connection region is less than 1, the elongation of the tab connection region of the composite current collector is relatively low, and it is possible to generate problems such as cold pressing cracks and a welding failure; when the ratio A of the thickness D4 of the conductive layer of the tab connection region to the thickness D3 of the insulating substrate of the tab connection region is greater than 2, the metallization degree of the tab connection region of the composite current collector is too high, it is easy to generate problems such as a large deposition amount and hole generation in the tab connection region in a manufacturing stage, and the relatively low elongation greatly increases cold pressing crack times despite the high overall strength, and the improved temperature rise and welding tensile strength at different rates; and thus, when 1≤A≤2, the tab connection region has an excellent strength and elongation with the high welding reliability; and the requirement for direct ultrasonic welding can be directly satisfied for the composite current collector, and the requirement for safety and reliability under discharging at a large battery rate is satisfied.

Further, by comparing Examples 12-17 with each other, it can be seen: when the addition amount of the conductive material in the insulating substrate is less than 3%, the temperature rise effect under finally different rates is not increased for a cell; and when the addition amount of the conductive material in the insulating substrate is greater than 10%, due to the excessive addition of the conductive material, the composite current collector has the reduced overall elongation with enhanced brittleness, and a cold pressing crack probability is progressively increased, causing an increased welding failure risk, and an aggravated insufficient welding problem to cause an abnormally increased temperature rise of a cell. Therefore, when the addition ratio of the conductive material is 3%-10% of the mass of the insulating substrate, the composite current collector has excellent mechanical performance, and the DCR of a battery, and temperature rise performance at different rates are also improved.

Example 7 and Comparative Example 1 are compared in terms of performance, and see table 3 and table 4.

TABLE 3

| | D1 (μm) | D2 (μm) | D3 (μm) | D4 (μm) | A | B | Conductive Material Addition Amount (wt. %) |
|---|---|---|---|---|---|---|---|
| Example 7 | 6 | 1 | 2 | 1 | 0.5 | 3 | 4 |
| Comparative Example 1 | 6 | 1 | 6 | 1 | 0.17 | 1 | 4 |

TABLE 4

| | Tab Connection Region Strength (Mpa) | Tab Connection Region Elongation (%) | Number of Cold Press Cracking (times/1000 m) | Ultrasonic Tab Welding Pulling Force (N) | DCR | Temperature Rise with 3 C Discharging at Ultrasonic Welding Seam (° C.) | Temperature Rise with 4 C Discharging at Ultrasonic Welding Seam (° C.) | Temperature Rise with 5 C Discharging at Ultrasonic Welding Seam (° C.) |
|---|---|---|---|---|---|---|---|---|
| Example 7 | 270 | 72% | 2 | 48 | 0.43 | 88 | 105 | 110 |
| Comparative Example 1 | 205 | 72% | 0.3 | 28 | 0.56 | 95 | 113 | 125 |

It can be seen from the above table 4:

Example 7 and Comparative Example 1 do not employ a direct ultrasonic welding mode, but a conventional switchover welding mode for a composite current collector to prepare a cell, and the ratio A of the metal thickness D4 of the tab region to the thickness D3 of the polymer layer of the tab region is less than 1 in Example 7 in this solution, and that possibly causes manufacturing influences on cold pressing cracks, but, it is found that, after a fine partial region is selected and prepared into a cell, the solution in Example 7 enables that the tab region has the high metallization strength and the small thickness ratio of the polymer layer to increase an switchover welding strength, and improves a current-flow temperature rise compared with the conventional structure of the comparative example.

The above-described embodiments are a part of the embodiments of the present application, and not all of the embodiments. The detailed description of the embodiments of the present application is not intended to limit the scope of the present application, but merely represents selected embodiments of the present application. All other embodiments obtained by a person of ordinary skill in the art based on the embodiments of the present application without making creative efforts shall fall within the protection scope of the present application.

The invention claimed is:

1. A composite current collector, comprising:

an insulating substrate; and a conductive layer; wherein the conductive layer is disposed on both sides of the insulating substrate in a thickness direction of the insulating substrate;

in a direction perpendicular to a thickness of the composite current collector, the composite current collector comprises an active material support region and a tab connection region, a thickness of the insulating substrate of the tab connection region is less than that of the insulating substrate of the active material support region; and a thickness of a conductive layer of the tab connection region is greater than that of a conductive layer of the active material support region;

a thickness of the insulating substrate of the tab connection region is D3 and a thickness of the conductive layer of the tab connection region is D4; and a ratio of D4 to D3 is A, where 1≤A≤2; and the insulating substrate comprises a conductive material, and based on mass percent, a ratio of the conductive material is 3%-10% of the mass of the insulating substrate.

2. The composite current collector according to claim 1, wherein the composite current collector has a same thickness at each position, a thickness of the insulating substrate of the active material support region is D1, where D3<D1.

3. The composite current collector according to claim 2, wherein a ratio of D1 to D3 is B, where B≥2.

4. The composite current collector according to claim 1, wherein the thickness of the insulating substrate of the active material support region is D1, where 3 μm≤D1≤10 μm.

5. The composite current collector according to claim 1, wherein the thickness of the conductive layer of the active material support region is D2, where 0.5 μm≤D2≤1.5 μm.

6. The composite current collector according to claim 1, wherein the thickness of the insulating substrate of the tab connection region is D3, where D3≤3 μm.

7. The composite current collector according to claim 6, wherein 1.5 μm≤D3≤3 μm.

8. The composite current collector according to claim 1, wherein the thickness of the conductive layer of the tab connection region is D4, where D4≥1.5 μm.

9. The composite current collector according to claim 8, wherein 1.5 μm≤D4≤4 μm.

10. The composite current collector according to claim 1, wherein the width of the tab connection region is L1, where L1≥10 mm.

11. The composite current collector according to claim 10, wherein 10 mm≤L1≤40 mm.

12. The composite current collector according to claim 1, wherein the conductive material comprises at least one of conductive carbon black, carbon nanotubes, acetylene black, or carbon fibers.

13. The composite current collector according to claim 1, wherein a material of the insulating substrate comprises at least one of an organic polymer insulating material, an inorganic insulating material, or a composite material.

14. The composite current collector according to claim 13, wherein the organic polymer insulating material comprises at least one of polyamide, polyterephthalate, polyimide, polyethylene, polypropylene, polystyrene, polyvinyl chloride, an acrylonitrile-butadiene-styrene copolymer, polybutylene terephthalate, poly-p-phenylene terephthalamide, polyoxymethylene, epoxy resin, phenolic resin, polytetrafluoroethylene, polyvinylidene fluoride, silicone rubber or polycarbonate; and/or the inorganic insulating material comprises at least one of alumina, silicon carbide or silicon dioxide; and/or the composite material comprises at least one of an epoxy resin glass fiber reinforced composite material or a polyester resin glass fiber reinforced composite material.

15. The composite current collector according to claim 1, wherein a material of the conductive layer comprises at least one of a metal conductive material or a carbon-based conductive material.

16. The composite current collector according to claim 15, wherein the metal conductive material comprises at least one of aluminum, copper, nickel, titanium, silver, a nickel-copper alloy, or an aluminum-zirconium alloy; and/or the carbon-based conductive material comprises at least one of graphite, acetylene black, graphene, or carbon nanotubes.

17. A battery, comprising the composite current collector according to claim 1.

* * * * *